US009354691B2

(12) United States Patent
Shih

(10) Patent No.: US 9,354,691 B2
(45) Date of Patent: May 31, 2016

(54) MONITORING PLURALITY OF PARAMETERS ON A NETWORK DEVICE AND ADJUSTING CLOCK SUPPLIED THERETO

(71) Applicant: Accton Technology Corporation, Hsinchu (TW)

(72) Inventor: Stone Shih, Taichung (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 207 days.

(21) Appl. No.: 14/166,534

(22) Filed: Jan. 28, 2014

(65) Prior Publication Data
US 2014/0365810 A1 Dec. 11, 2014

(30) Foreign Application Priority Data

Jun. 7, 2013 (TW) .............................. 102120254 A

(51) Int. Cl.
*G06F 1/32* (2006.01)
*G06F 1/08* (2006.01)

(52) U.S. Cl.
CPC *G06F 1/324* (2013.01); *G06F 1/08* (2013.01); *G06F 1/3209* (2013.01); *G06F 1/3278* (2013.01); *Y02B 60/126* (2013.01); *Y02B 60/1217* (2013.01); *Y02B 60/32* (2013.01)

(58) Field of Classification Search
CPC ..... G06F 1/324; G06F 1/3234; G06F 1/3206; G06F 1/3228
USPC ................................................. 713/320, 322
See application file for complete search history.

(56) References Cited

U.S. PATENT DOCUMENTS

| | | | | |
|---|---|---|---|---|
| 6,292,831 B1 * | 9/2001 | Cheng | ................. | G06F 11/3006 709/224 |
| 2004/0153263 A1 * | 8/2004 | Holle | ................... | G06F 1/3228 702/60 |
| 2007/0061108 A1 * | 3/2007 | DeWitt | ............... | G06F 11/3423 702/183 |
| 2007/0254681 A1 * | 11/2007 | Horvath | ................. | H04W 4/14 455/466 |
| 2008/0301474 A1 * | 12/2008 | Bussa | ................... | G06F 1/3203 713/300 |
| 2010/0103923 A1 * | 4/2010 | Nosley | ............... | H04W 72/005 370/350 |
| 2013/0113527 A1 * | 5/2013 | Mienkina | ................. | G06F 1/08 327/114 |
| 2013/0170369 A1 * | 7/2013 | Liao | ..................... | H04N 5/0736 370/252 |
| 2013/0173802 A1 * | 7/2013 | Saffre | ................... | G06F 1/3209 709/226 |
| 2013/0346587 A1 * | 12/2013 | Barkett | .................. | G06Q 50/01 709/224 |

FOREIGN PATENT DOCUMENTS

| TW | I269963 A | 1/2007 |
|---|---|---|
| TW | 201304395 A | 1/2013 |

* cited by examiner

*Primary Examiner* — Thomas Lee
*Assistant Examiner* — Santosh R Poudel
(74) *Attorney, Agent, or Firm* — Birch, Stewart, Kolasch & Birch, LLP

(57) ABSTRACT

The power saving device and method are provided. The power saving device which applies to a network apparatus includes a Phase-Locked Loop circuit, a computing module and a clock-selecting register, the Phase-Locked Loop circuit is configured to receive a reference clock frequency and generate a clock frequency-increasing signal according to the reference clock frequency; the computing unit is configured to calculate a setting parameter and the clock-selecting register is configured to generate an operating clock signal according to the clock frequency-increasing signal and setting parameter and send the operating clock signal to the network apparatus, wherein the network apparatus adjusts the clock frequency rate according to the operating clock signal.

8 Claims, 4 Drawing Sheets

MONITORING PLURALITY OF PARAMETERS ON A NETWORK DEVICE AND ADJUSTING CLOCK SUPPLIED THERETO

CROSS REFERENCE TO RELATED APPLICATIONS

This Application claims priority of Taiwan Patent Application No. 102120254, filed on Jun. 7, 2013, the entirety of which is incorporated by reference herein.

BACKGROUND OF THE INVENTION

1. Field of the Invention

The invention generally relates to a power-saving device and a power-saving method, and more particularly to the adjustment of an operating clock of the network device according to a clock-setting parameter for saving power.

2. Description of the Related Art

Recently, the operating clock of the central processing unit (CPU) of the network device may set at a static frequency and the frequency is sufficient for operating. However, the higher operating clock may generate more power consumption. When the loading state of the central processing unit is in a lower state, operation with the higher operating clock may generate unnecessary power consumption. Therefore, how to adjust the operating clock according to the loading state of the central processing unit for saving power may be an important subject.

BRIEF SUMMARY OF THE INVENTION

Power-saving technology of the network device that operates by adjusting the operating clock of the network device according to a clock-setting parameter is provided to overcome the above-mentioned problems.

A power saving device for a network device, comprising: a Phase-Locked Loop (PLL), configured to receive a reference clock and generate a frequency-increasing clock according to the reference clock; a computing unit, configured to generate a clock-setting parameter, and a clock-selecting register, configured to generate an operating clock according to the frequency-increasing clock and the clock-setting parameter, and transmit the operating clock to the network device, wherein the network device adjusts a clock value according to the operating clock.

A power saving method for a network device, comprising: generating a frequency-increasing clock according to a reference clock by a Phase-Locked Loop (PLL); generating a clock-setting parameter by a computing unit; generating an operating clock by a clock-selecting register according to the frequency-increasing clock and the clock-setting parameter; and adjusting a clock value by the network device according to the operating clock.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
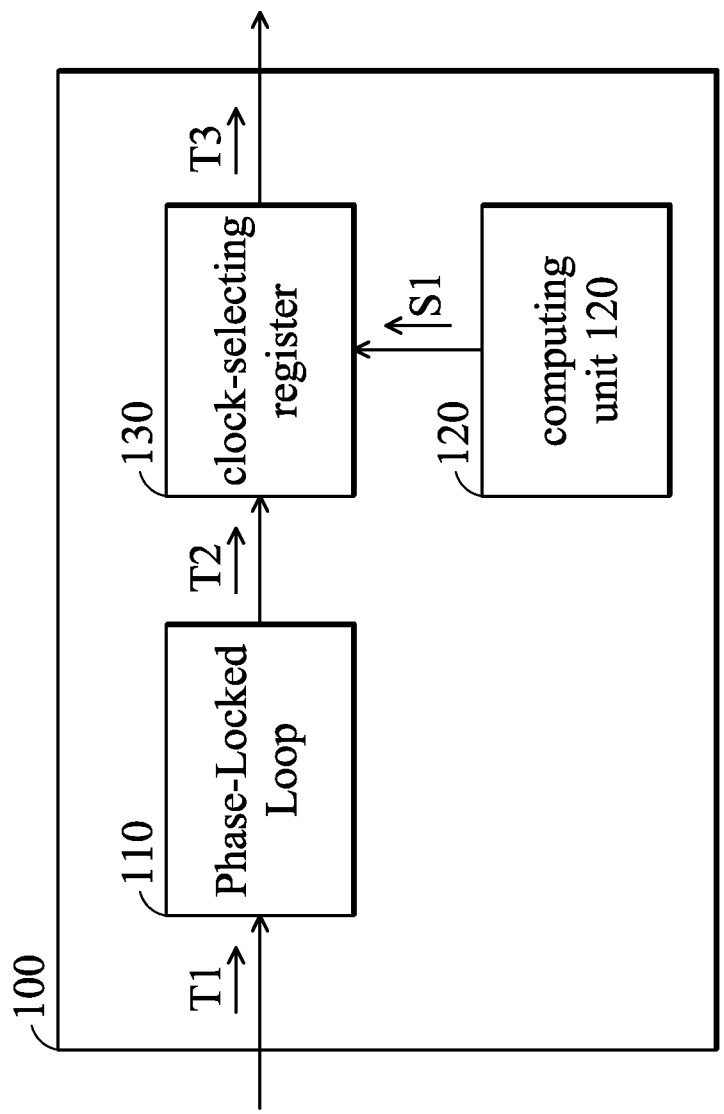
FIG. 1 is a block diagram of a power saving device 100 according to an embodiment of the invention.

FIG. 1 is a block diagram of a power saving device 100 according to an embodiment of the invention. The power saving device 100 is applied in a network device, such as a switch, a router, an access point, and so on. As shown in FIG. 1, the power saving device 100 comprises a Phase-Locked Loop (PLL) 110, a computing unit 120 and a clock-selecting register 130. In an embodiment of the invention, the power saving device 100 may be implemented as an independent device and connect with the network device for achieving benefit of the invention. In another embodiment, the power saving device 100 may be comprised in the central processing unit (CPU) of the network device.

In an embodiment of the invention, the Phase-Locked Loop 110 is configured to receive a reference clock T1 and generates a frequency-increasing clock T2, wherein the reference clock T1 is provided by an oscillator (not presented). When the Phase-Locked Loop 110 receives the reference clock T1 provided by the oscillator, the Phase-Locked Loop 110 may increase the frequency of the reference clock T1 to the frequency-increasing clock T2 to meet the system requirements and to fix the frequency of the frequency-increasing clock T2. The frequency-increasing clock T2 is registered in the clock-selecting register 130 by the Phase-Locked Loop 110. In an embodiment of the invention, the Phase-Locked Loop 110 may also increase the frequency of the reference clock T1 to generate a plurality of frequency-increasing clocks T2, and store the plurality of the frequency-increasing clocks T2 in the clock-selecting register 130. For example, if the maximal required frequency of the operating clock of the central processing unit is 500 MHz, and the reference clock T1 provided by the oscillator is 50 MHz, the Phase-Locked Loop 110 can generate a plurality of the frequency-increasing clocks T2, such as 500 MHz, 400 MHz, 300 MHz, and so on, according to the reference clock T1, and store the frequency-increasing clocks T2 in the clock-selecting register 130. Note that, in the following embodiments, the frequency-increasing clock T2 is the maximal required frequency of the operating clock of the central processing unit.

Figure 2:
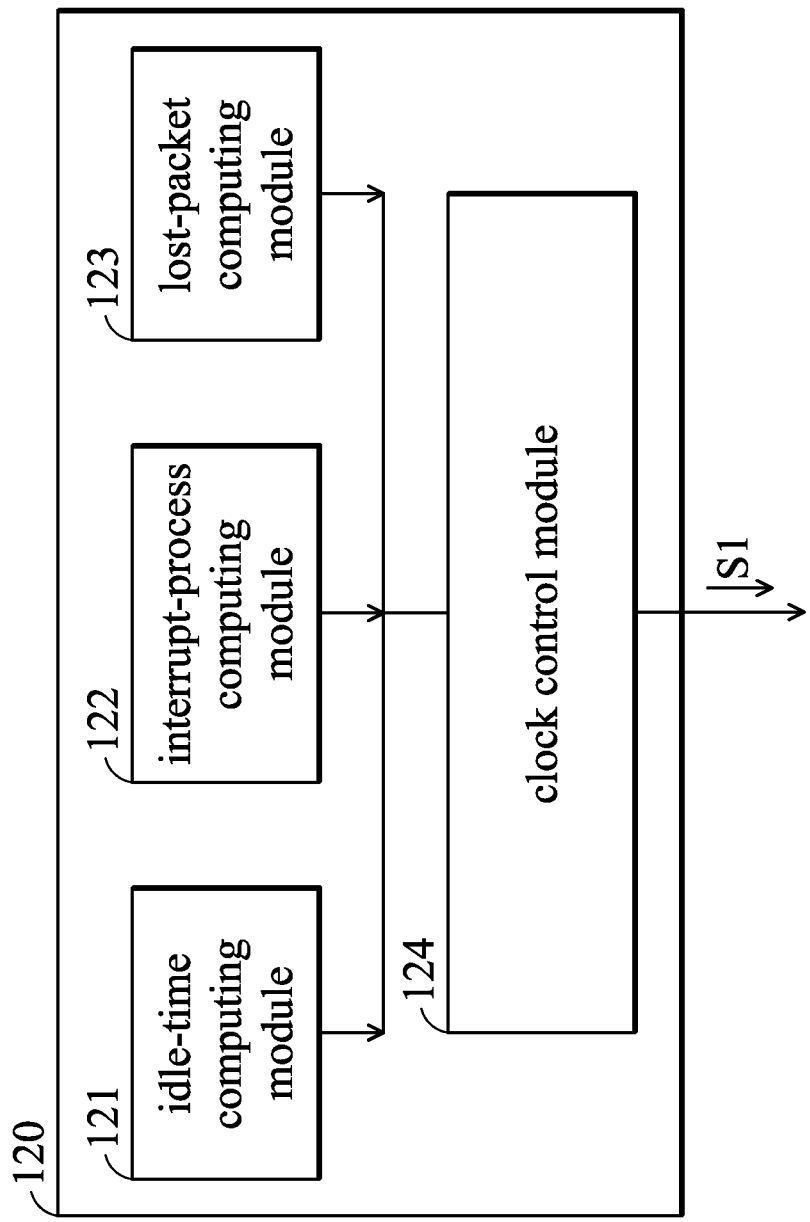
FIG. 2 is a block diagram of the computing unit 120 according to an embodiment of the invention.

FIG. 2 is a block diagram of the computing unit 120 according to an embodiment of the invention. In one embodiment, the computing unit 120 comprises an idle-time computing module 121, an interrupt-process computing module 122, a lost-packet computing module 123 and a clock control module 124. The idle-time computing module 121 is configured to compute the idle time of the network device during a period of time. That is to say, the idle-time computing module 121 may compute the time that the network device is in an idle state during the period of time. The interrupt-process computing module 122 is configured to compute the interrupt time of the network device in the Interrupt Service Routing (ISR) during the periodic time. That is to say, the interrupt-process computing module 122 may compute the time of the network device executes the Interrupt Service Routing (ISR) during the periodic time. The lost packet computing module 123 is configured to compute the number of lost packets of the network device during the periodic time. That is to say, the lost packet computing module 123 may compute the lost packets of the network device during the periodic time, wherein the lost packets are the packets which are not processed when the buffer queue is full or the packet receiving buffer is overloaded, and the lost packets are the error packets in the process. Finally, the clock control module 124 may generate the clock-setting parameter S1 according to the computed results of the idle-time computing module 121, the interrupt-process computing module 122 and the lost packet computing module 123. In an embodiment of the invention, the periodic time is 0.01 sec, 0.1 sec, 10 sec, and so on.

In an embodiment of the invention, the clock-setting parameter S1 is set according to a loading parameter. That is to say, the clock-setting parameter S1 may be set at different values according to the loading parameter being in different ranges. Detailed descriptions are discussed in more below. In an embodiment of the invention, the loading parameter is defined as follows:

$$\text{loading parameter} = (\text{task time})/(\text{periodic time}),$$

wherein the task time is defined as follows:

$$\text{task time} = (\text{periodic time} - \text{idle time} - \text{interrupt time}) * (1 + \text{the number of lost packets})$$

In an embodiment of the invention, the clock-selecting register 130 may select and adjust the operating clock T3 according to the frequency-increasing clocks T2 and the setting parameter S1. The operation of the clock-selecting register 130 is as follow: If the loading parameter is less than a first set value, the clock-selecting register 130 may adjust the operating clock T3 to a first proportion of the frequency-increasing clocks T2. If the loading parameter is greater than (or equal to) a first set value and less than a second set value, the clock-selecting register 130 may adjust the operating clock T3 to a second proportion of the frequency-increasing clocks T2. If the loading parameter is larger than (or equal to) the second set value and less than a third set value, the clock-selecting register 130 may adjust the operating clock T3 to a third proportion of the frequency-increasing clocks T2. If the loading parameter is larger than (or equal to) the third set value, the clock-selecting register 130 may maintain the operating clock T3 in the frequency-increasing clocks T2. For example, if the loading parameter is less than 0.1, the clock-selecting register 130 may adjust the operating clock T3 to $\frac{1}{8}$ of the frequency-increasing clocks T2. If the loading parameter is less than 0.2, the clock-selecting register 130 may adjust the operating clock T3 to $\frac{1}{4}$ of the frequency-increasing clocks T2. If the loading parameter is less than 0.4, the clock-selecting register 130 may adjust the operating clock T3 to $\frac{1}{2}$ of the frequency-increasing clocks T2. If the loading parameter is larger than 0.4, the clock-selecting register 130 may maintain the operating clock T3 in the frequency-increasing clocks T2. Note that, the invention is not limited by the above example which has been described. Those who are skilled in this technology can set different set values according to different real requirements, and set different proportions of the frequency-increasing clocks T2 for adjusting the operating clock T3 according to the set values. In addition, in the embodiment, only three ranges (e.g. first set value, second set value, and third set value) are described. Those who are skilled in this technology can also add or decrease the number of ranges (e.g. adding a fourth set value, fifth set value, and so on) for adjusting and selecting the operating clock T3.

In an embodiment of the invention, when the network device has obtained the operating clock T3, the network device may operate according to the operating clock T3. Therefore, the network device can adjust the operating clock T3 dynamically by the power saving device 100 according to the different loading state of the central processing unit (CPU) for saving power.

Figure 3:
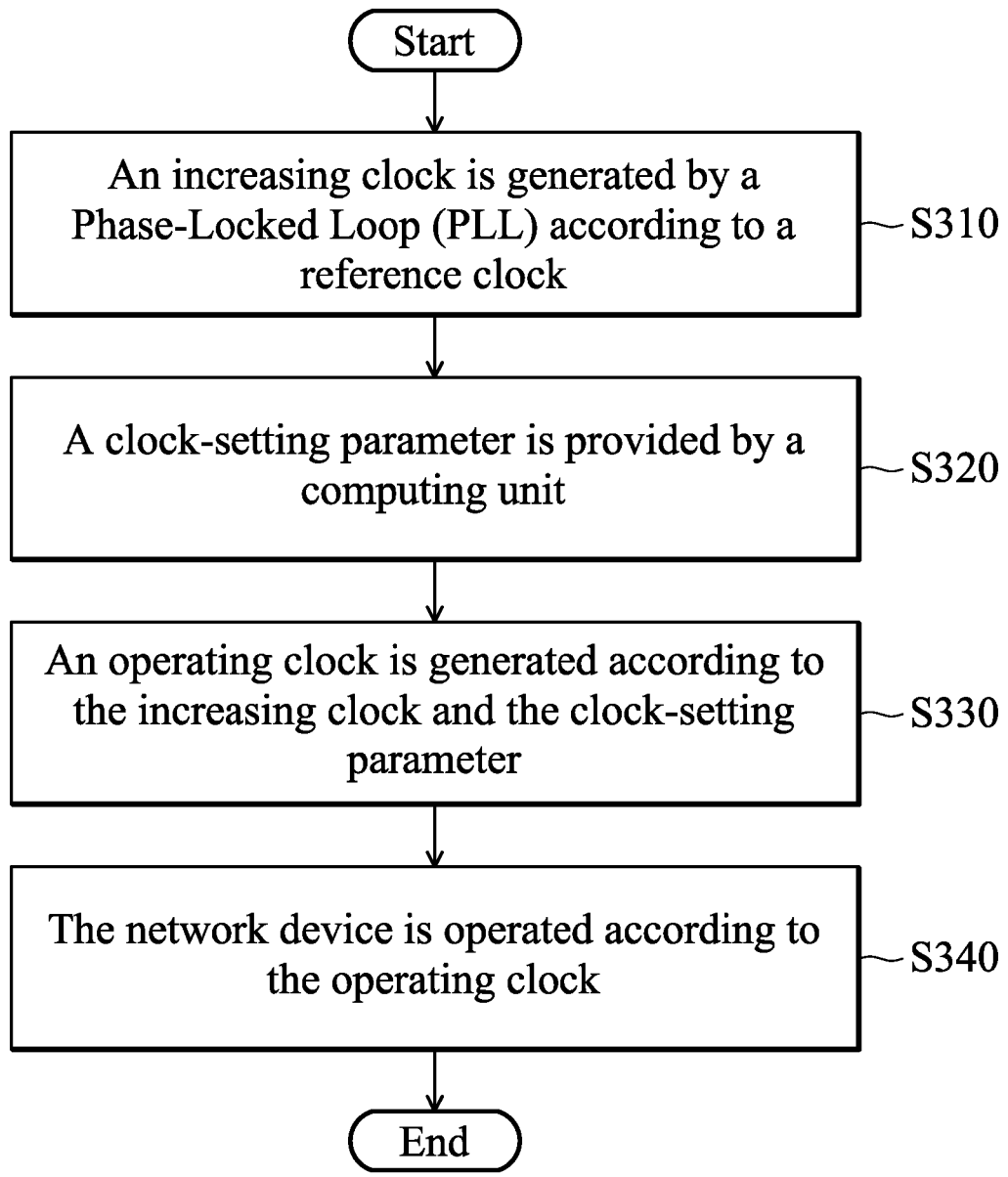
FIG. 3 is a flow chart 300 illustrating the power saving method according to an embodiment of the invention.

FIG. 3 is a flow chart 300 illustrating the power saving method according to an embodiment of the invention. The method is applied to a network device, such as a switch, a router, an access point, and so on. Firstly, in step S310, an increasing clock is generated by a Phase-Locked Loop (PLL) according to a reference clock. In step S320, a clock-setting parameter is provided by a computing unit. In step S330, an operating clock is generated according to the increasing clock and the clock-setting parameter. In step S340, the network device is operated according to the operating clock.

Figure 4:
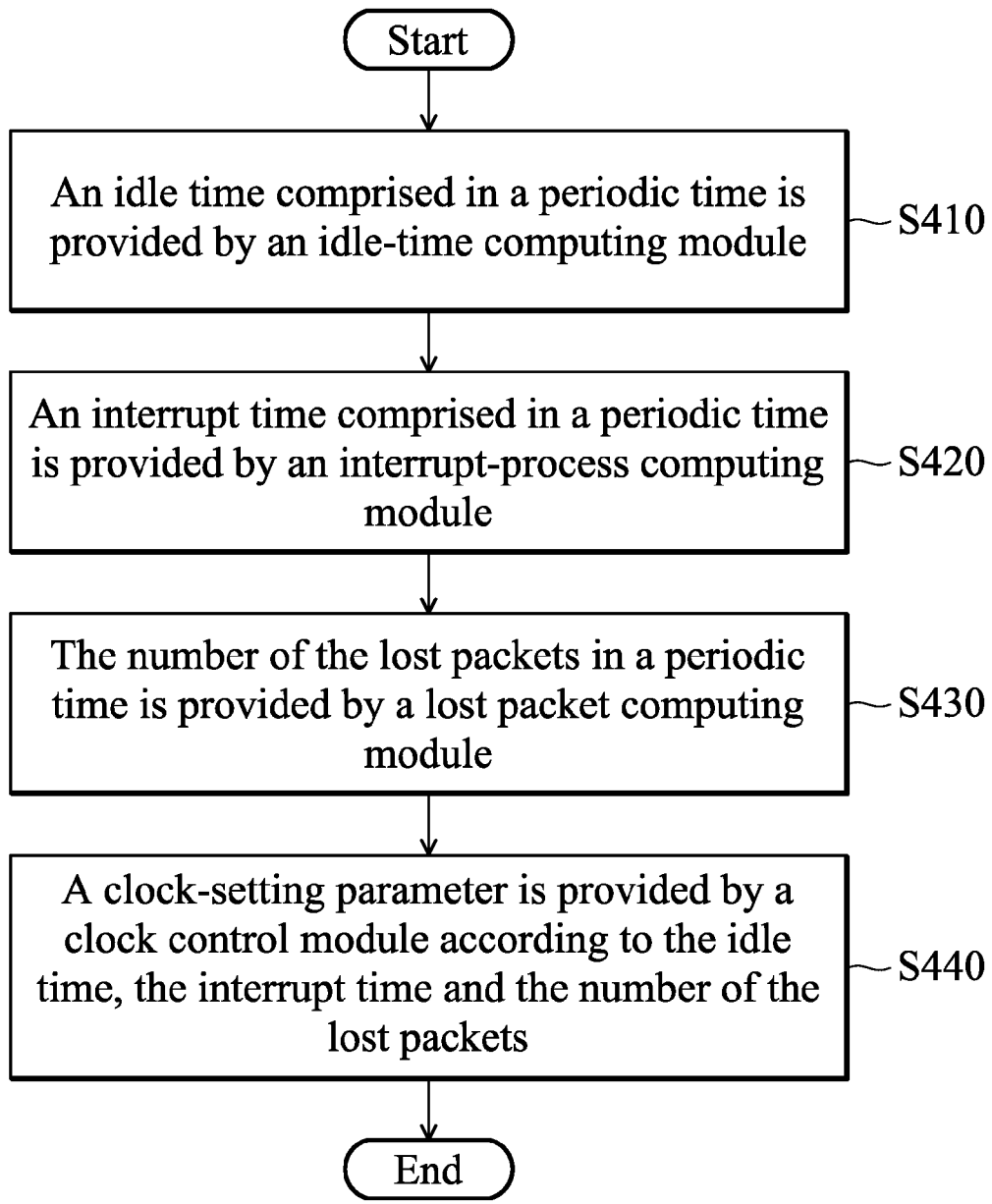
FIG. 4 is a flow chart 400 illustrating the step S320 according to another embodiment of the invention.

FIG. 4 is a flow chart 400 illustrating the step S320 according to another embodiment of the invention. Firstly, in step S410, an idle time comprised in a periodic time is provided by an idle-time computing module. In step S420, an interrupt time comprised in a periodic time is provided by an interrupt-process computing module. In step S430, the number of the lost packets in a periodic time is provided by a lost packet computing module. In step S440, a clock-setting parameter is provided by a clock control module according to the idle time, the interrupt time and the number of the lost packets. In an embodiment of the invention, the method further comprises the step of setting the clock-setting parameter according to a loading parameter. If the loading parameter is less than a set value, the operating clock is set a proportion of the frequency-increasing clock according to the set value.

Currently, the operating clock of the central processing unit (CPU) of the network device is set at a static frequency and the frequency is sufficient for operating. However, the higher operating clock may generate more power consumption. Therefore, when the loading state of the central processing unit is in a lower state, operation with the higher operating clock may generate unnecessary power consumption. Therefore, with the help of the power saving method provided in present invention, the operating clock of the central processing unit (CPU) can be adjusted and selected according to the operating state and the number of packets of the network device for reducing the unnecessary power consumption.

Memory-management methods for mobile devices, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

References throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention. Furthermore, the particular features, structures, or characteristics may be combined in any suitable manner in one or more embodiments.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents. In addition, reference numbers may be repeated throughout the embodiments, but they do not require that feature(s) of one embodiment apply to another embodiment, even if they share the same reference number.

What is claimed is:

1. A power saving device for a network device, comprising:
   a Phase-Locked Loop (PLL), configured to receive a reference clock and generate a frequency-increasing clock according to the reference clock;
   a computing unit, wherein the computing unit comprises:
      an idle-time computing module, configured to calculate an idle time of the network device in an idle state during a periodic time;
      an interrupt-process computing module, configured to calculate an interrupt time of the network device in a Interrupt Service Routing (ISR) during the periodic time;
      a lost packet computing module, configured to calculate a number of the lost packets of the network device during the periodic time; and
      a clock control module, configured to generate a clock-setting parameter according to the idle time, the interrupt time and the number of the lost packets; and
   a clock-selecting register, configured to generate an operating clock according to the frequency-increasing clock and the clock-setting parameter, and transmit the operating clock to the network device, wherein the network device adjusts a clock value according to the operating clock.

2. The power saving device of claim 1, wherein the clock control module calculates a loading parameter according to the idle time, the interrupt time and the number of the lost packets, and the clock control module generates the clock-setting parameter corresponding to the loading parameter.

3. A power saving method for a network device, comprising:
   generating a frequency-increasing clock according to a reference clock by a Phase-Locked Loop (PLL);
      calculating an idle time of the network device in an idle state during a periodic time by an idle-time computing module of the computing unit;
      calculating an interrupt time of the network device in an Interrupt Service Routing (ISR) during the periodic time by an interrupt-process computing module of the computing unit;
      calculating a number of the lost packets of the network device during the periodic time by a lost packet computing module of the computing unit;
      generating the clock-setting parameter by a clock control module of the computing unit according to the idle time, the interrupt time and the number of the lost packets;
      generating an operating clock by a clock-selecting register according to the frequency-increasing clock and the clock-setting parameter; and
      adjusting a clock value by the network device according to the operating clock.

4. The power saving method of claim 3, wherein the step of generating the clock-setting parameter by the clock control module according to the idle time, the interrupt time and the number of the lost packets, further comprising:
   calculating a loading parameter by the clock control module according to the idle time, the interrupt time and the number of the lost packets; and
   generating the clock-setting parameter corresponding to the loading parameter by the clock control module.

5. The power saving method of claim 4, wherein the step of generating the clock-setting parameter corresponding to the loading parameter by the clock control module further comprises:
   setting the clock value to a first proportion of the frequency-increasing clock when the clock control module determines the loading parameter is less than a first set value; and
   generating the clock-setting parameter corresponding to the loading parameter.

6. The power saving method of claim 5, wherein the step of generating the clock-setting parameter corresponding to the loading parameter by the clock control module further comprises:
   setting the clock value to a second proportion of the frequency-increasing clock when the clock control module determines the loading parameter is larger than or equal to the first set value and less than a second set value; and
   generating the clock-setting parameter corresponding to the loading parameter.

7. The power saving method of claim 6, wherein the step of generating the clock-setting parameter corresponding to the loading parameter by the clock control module further comprises:
   setting the clock value to a third proportion of the frequency-increasing clock when the clock control module determines the loading parameter is larger than or equal to the second set value and less than a third set value; and
   generating the clock-setting parameter corresponding to the loading parameter.

8. The power saving method of claim 7, wherein the step of generating the clock-setting parameter corresponding to the loading parameter by the clock control module, further comprising:
   setting the clock value to the frequency-increasing clock when the clock control module determines the loading parameter is larger than the third set value; and
   generating the clock-setting parameter corresponding to the loading parameter.

* * * * *